April 12, 1927.

J. J. NEVILLS

FEEDER

Filed July 11, 1924

1,624,175

Witness:
R. Burkhardt

Inventor:
John J. Nevills,
By Wilkinson, Huxley, Byron & Knight
Attys.

Patented Apr. 12, 1927.

1,624,175

UNITED STATES PATENT OFFICE.

JOHN J. NEVILLS, OF SACRAMENTO, CALIFORNIA, ASSIGNOR TO LIBBY, McNEILL & LIBBY, OF CHICAGO, ILLINOIS, A CORPORATION OF MAINE.

FEEDER.

Application filed July 11, 1924. Serial No. 725,376.

The present invention relates to feeders.

In delivering fruit, vegetables and other articles to sorting or grading tables, it is very desirable that said articles be delivered uniformly. If said articles are delivered to said sorting or grading tables at too high a rate, the sorting or grading cannot be properly accomplished, and if said articles are delivered at too low a rate, a loss of time is suffered.

An object of the present invention is to provide feeding means for uniformly delivering fruit, vegetables or other articles, though the supply of said articles to said feeder may be intermittent.

A further object is to provide feeding mechanism which will deliver a uniform supply of fruit, vegetables, or other articles from an intermittent supply without danger of bruising said articles.

Further objects will appear as the description proceeds.

Referring to the drawings—

Figure 1:
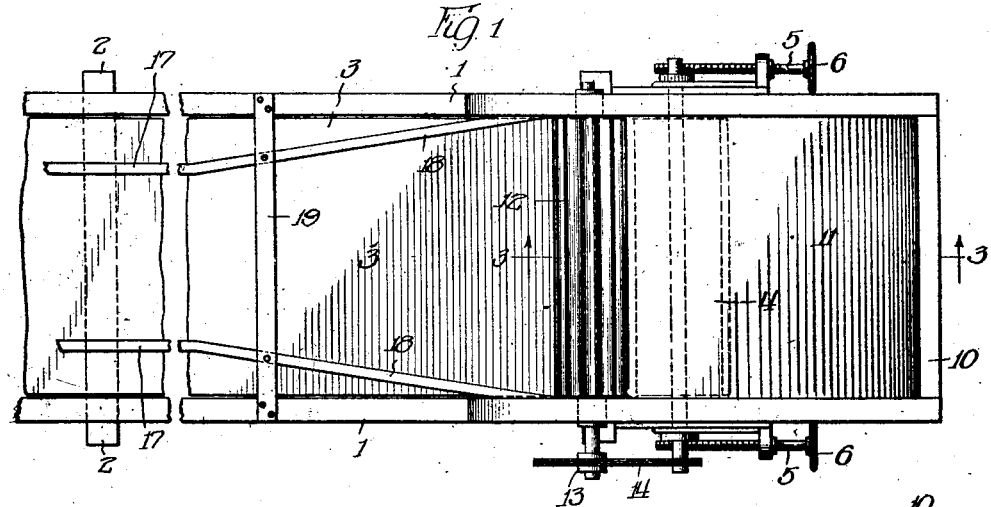
Figure 1 is a top plan view of one embodiment of the present invention.
Figure 2:
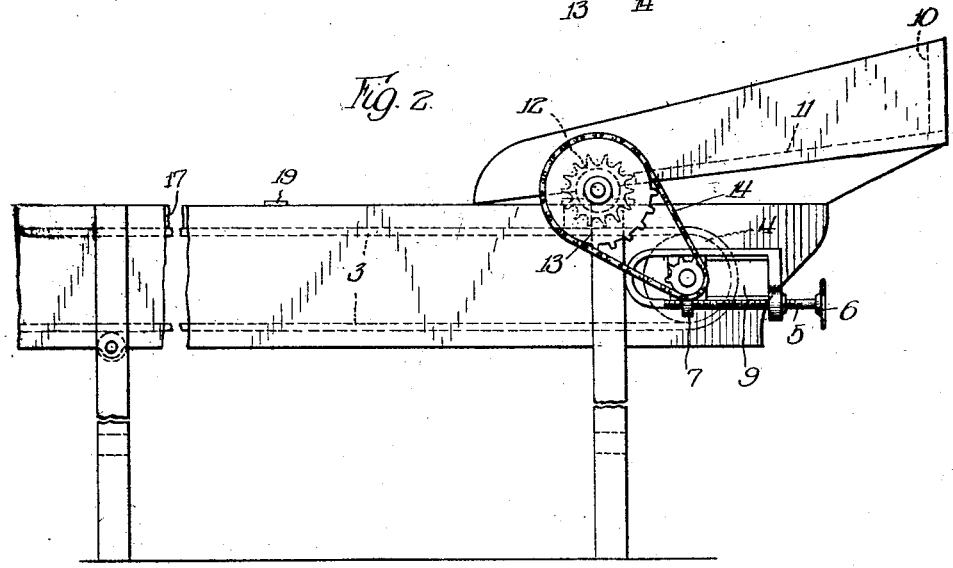
Figure 2 is a view in side elevation of the structure shown in Figure 1.

Though the present invention is adapted for the feeding of fruit, vegetables or other articles of great variety, including olives, cherries, beans and peas, it will for the purpose of convenience of description be referred to as an olive feeder.

The illustrated embodiment of the present invention comprises a pair of side frame members 1—1, which may be supported by legs 2—2. Mounted on suitable drums carried by the side frame members 1—1 is an endless belt 3. Only one of the drums for carrying the belt 3 is illustrated, said drum being indicated by the numeral 4. The position of said drum may be adjusted longitudinally of the frame by means of the screw-threaded shafts 5—5, which shafts are provided with the handles 6—6. Said screw-threaded shafts 5—5 may have screw-threaded engagement with nuts 7, which nuts 7 form part of slidable bearing members for the drum 4. Said bearing members, indicated by the numeral 8, are longitudinally slidable in slots 9 provided for that purpose.

Mounted above the upper surface of the belt 3 is the hopper 10 having the slanting bottom 11. Arranged in proximity to said bottom 11 and preferably with its axis of rotation spaced below the upper surface of said bottom 11 is the corrugated drum 12, which extends the width of the hopper 10. Fixed upon the same shaft with the drum 12 is the sprocket gear 13, which may be driven from the drum 4 by means of the sprocket chain 14. The corrugated drum 12 comprises a plurality of radially extending ribs 15—15 providing pockets 16—16 extending from end to end of said drum 12.

The illustrated embodiment of the present invention is provided with a pair of guide members 17—17 extending longitudinally of the feeder, said guide members 17—17 being outwardly flared toward the ends of the corrugated drum 12, as indicated by the numerals 18—18. Said guides are mounted above the upper surface of the belt 3 and serve to direct the olives or other articles being delivered to a region centrally of belt 3. Said guides 17—17 may be held in position by means of cross bars, only one of which is illustrated, said bar being indicated by the numeral 19.

Figure 3:
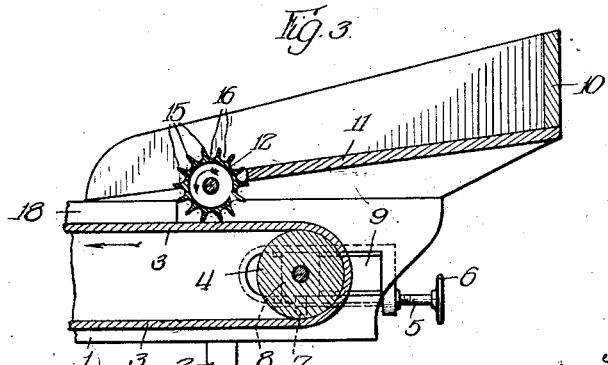
Figure 3 is a longitudinal sectional view taken along the plane indicated by the arrows 3—3 of Figure 1.

The belt 3 will move in the direction indicated by the single-tailed arrow in Figure 3, and the drum 12 will be driven in the direction of the double-tailed arrow in said figure. The olives or other articles to be delivered are placed within the hopper 10 having the sloping bottom 11. Said olives or other articles will gravitate toward the corrugated drum 12, and as said drum revolves it picks up the olives or other articles and carries them into a position to be deposited upon the moving belt 3. Assuming constant rotation of the corrugated drum 12, the olives are fed in uniform quantities to the moving belt 3, the olives in the hopper 10 gravitating constantly to a position to be picked up by the revolving drum 12. The olives or other articles delivered to the belt 3 are carried by said belt to sorting tables or graders. A workman may handle the job of keeping a number of feeders supplied with olives, no particular discretion being required on his part to avoid an excess of supply to any of the feeders which he is handling. The parts may be so designed and the speed of motion may be so chosen that olives or other articles will be delivered at just the proper speed to keep the sorters or graders busy, whereby the sorting and grading operations may be performed with the best efficiency. It has been demonstrated in actual practice that no damage whatever results to even such tender fruit as cherries or olives.

Though a preferred embodiment of the present invention has been described in detail, it will be clear that many modifications will occur to those skilled in the art. It is intended to cover all such modifications that fall within the scope of the appended claim.

What is claimed is:

An olive feeder comprising, in combination, an endless belt, a sloping delivery floor mounted adjacent to said belt, a drum having its axis of rotation parallel with said floor and transversely to the direction of slope of said floor, said axis being disposed slightly below the upper surface of said floor, said drum being longitudinally ribbed to provide a plurality of elongated recesses spaced circumferentially of said drum, means for moving said belt in a direction such that the upper surface thereof moves away from said floor, and means for driving said drum in a direction such that the upgoing side of said drum is toward the upper portion of said slope.

Signed at Sacramento, California, this 19th day of May, 1924.

JOHN J. NEVILLS.